United States Patent [19]
Amini et al.

[11] Patent Number: 5,659,696
[45] Date of Patent: Aug. 19, 1997

[54] METHOD AND APPARATUS FOR DETERMINING ADDRESS LOCATION AND TAKING ONE OF TWO ACTIONS DEPENDING ON THE TYPE OF READ/WRITE DATA TRANSFER REQUIRED

[75] Inventors: Nader Amini, Boca Raton; Richard Louis Horne, Boynton Beach, both of Fla.

[73] Assignee: International Business Machines Corporation, Armonk, N.Y.

[21] Appl. No.: 298,538

[22] Filed: Aug. 30, 1994

Related U.S. Application Data

[63] Continuation of Ser. No. 816,698, Jan. 2, 1992, abandoned.
[51] Int. Cl.[6] .................................................. G06F 13/00
[52] U.S. Cl. ...................... 395/412; 395/306; 395/280; 395/821; 395/824; 364/238.3; 364/240; 364/242.1; 364/927.93
[58] Field of Search ................. 395/182.1, 200.2, 395/280, 306, 412, 821, 824; 364/238.3, 240, 242.1, 927.93

[56] References Cited

U.S. PATENT DOCUMENTS

| | | | |
|---|---|---|---|
| 3,469,241 | 9/1969 | Barton et al. | 395/425 |
| 4,466,098 | 8/1984 | Southard | 395/182.1 |
| 4,695,948 | 9/1987 | Blevins et al. | 364/200 |
| 4,700,292 | 10/1987 | Campanini | 395/200.2 |
| 4,964,036 | 10/1990 | De Azevedo, Jr. et al. | 364/200 |
| 5,068,820 | 11/1991 | Nojima et al. | 395/275 |
| 5,077,656 | 12/1991 | Waldron et al. | 395/425 |

*Primary Examiner*—Thomas C. Lee
*Assistant Examiner*—Po C. Huang
*Attorney, Agent, or Firm*—Bernard D. Bogdon

[57] ABSTRACT

A bus interface unit for passing data between an I/O bus and a system bus in a dual bus computer system is provided. The bus interface unit has incorporated therein an address listing and compare function to determine whether a requesting device on the I/O bus is to read data from or write data to an address on the system bus. If so, the bus interface unit allows passing of the data therethrough. If not, the system bus is relinquished and the requesting device writes to the address on the I/O bus. Also, compare logic is incorporated in the bus interface unit which decodes system bus addresses originated from a system bus controller such as the DMA, to determine whether the destination of the transfer is to system memory or the I/O bus.

12 Claims, 7 Drawing Sheets

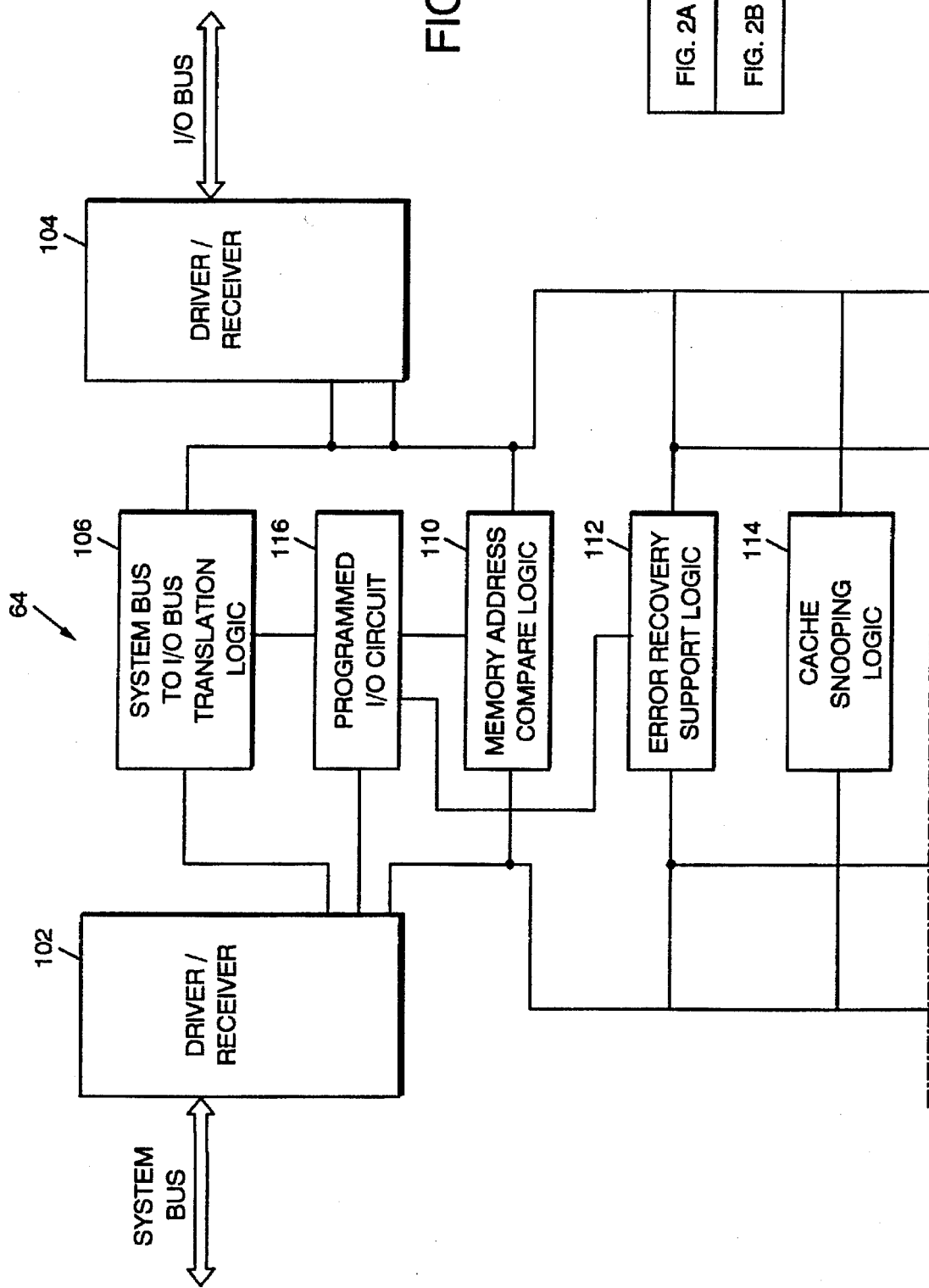

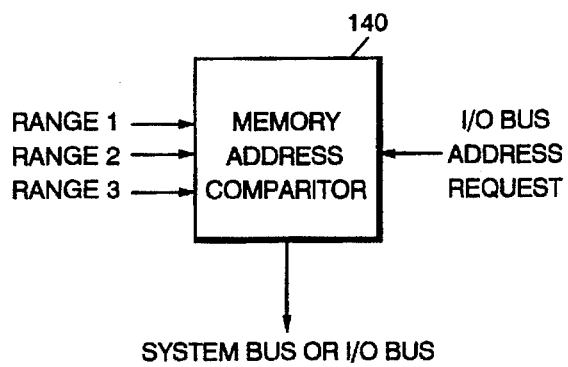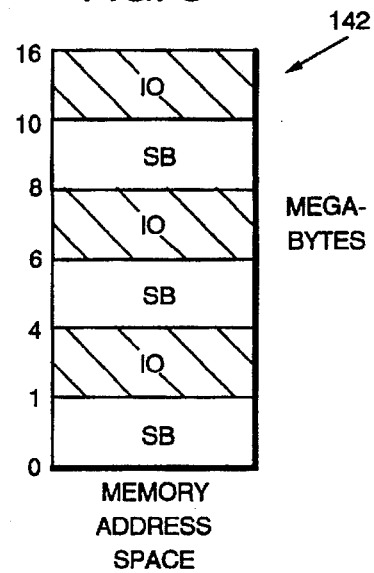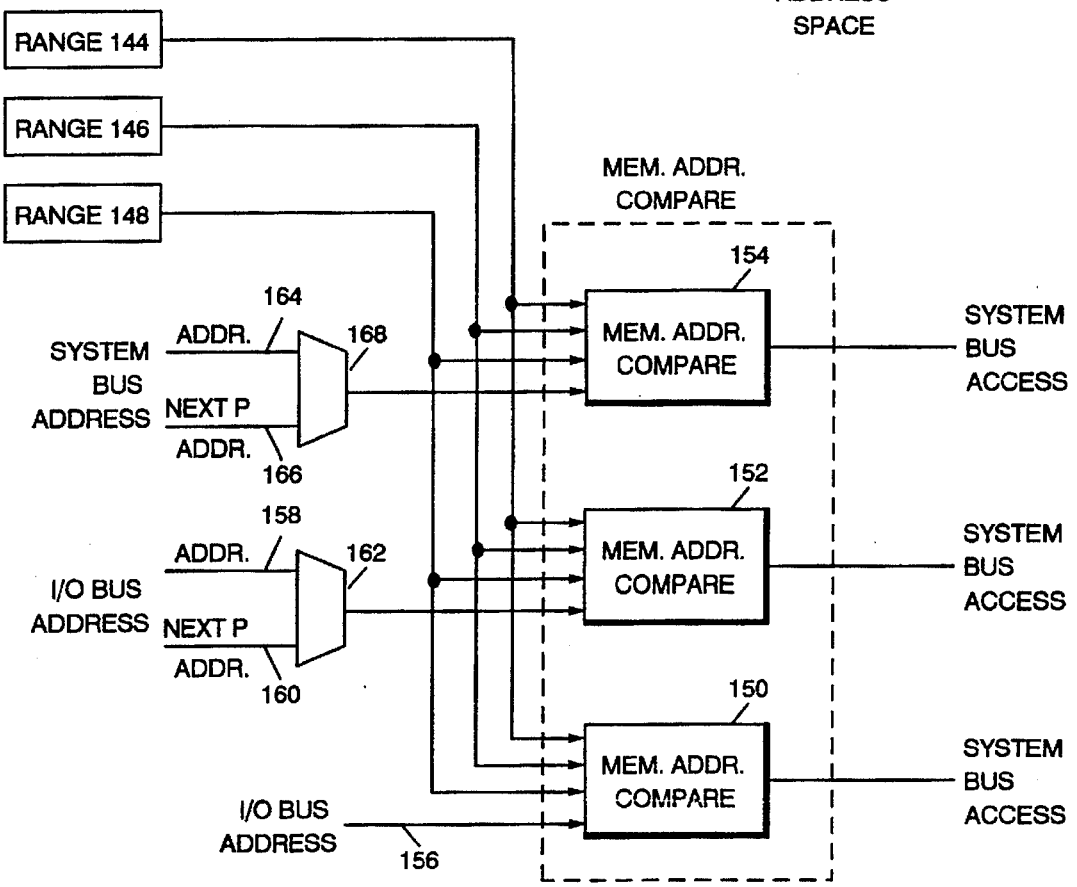

METHOD AND APPARATUS FOR DETERMINING ADDRESS LOCATION AND TAKING ONE OF TWO ACTIONS DEPENDING ON THE TYPE OF READ/WRITE DATA TRANSFER REQUIRED

This is a continuation of application Ser. No. 07/816,698 filed on Jan. 2, 1992, now abandoned.

RELATED APPLICATIONS

The following U.S. patent applications are incorporated herein by reference as if they had been fully set out:

application Ser. No. 07/815,992 Filed Jan. 2, 1992 Entitled "BUS CONTROL LOGIC FOR COMPUTER SYSTEM HAVING DUAL BUS ARCHITECTURE", now abandon.

application Ser. No. 07/816,116 Filed Jan. 2, 1992 Entitled "ARBITRATION MECHANISM", now U.S. Pat. No. 5,265,211.

application Ser. No. 07/816,184 Filed Jan. 2, 1992 Entitled "PARITY ERROR DETECTION AND RECOVERY", now U.S. Pat. No. 5,313,627.

application Ser. No. 07/816,204 Filed Jan. 2, 1992 Entitled "CACHE SNOOPING AND DATA INVALIDATION TECHNIQUE", now abandon.

application Ser. No. 07/816,203 Filed Jan. 2, 1992 Entitled "BUS INTERFACE LOGIC FOR COMPUTER SYSTEM HAVING DUAL BUS ARCHITECTURE", now U.S. Pat. No. 5,255,374.

application Ser. No. 07/816,691 Filed Jan. 2, 1992 Entitled "BIDIRECTIONAL DATA STORAGE FACILITY FOR BUS INTERFACE UNIT", now abandon.

application Ser. No. 07/816,693 Filed Jan. 2, 1992 Entitled "BUS INTERFACE FOR CONTROLLING SPEED OF BUS OPERATION", now abandon.

FIELD OF THE INVENTION

The present invention relates to bus to bus interfaces in dual bus architecture computer systems, and more particularly to a bus to bus interface unit and method for using the bus to bus interface unit to determine whether a memory location is in system memory coupled to a system bus or in a device coupled to an I/O bus.

BACKGROUND OF THE INVENTION

Generally in computer systems and especially in personal computer systems, data is transferred between various system devices such as a central processing unit (CPU), memory devices, and direct memory access (DMA) controllers. In addition, data is transferred between expansion elements such as input/output (I/O) devices, and between these I/O devices and the various system devices. The I/O devices and the system devices communicate with and amongst each other over computer buses, which comprise a series of conductors along which information is transmitted from any of several sources to any of several destinations. Many of the system devices and the I/O devices are capable of serving as bus controllers (i.e., devices which can control the computer system) and bus slaves (i.e., elements which are controlled by bus controllers).

Personal computer systems having more than one bus are known. Typically, a local bus is provided over which the CPU communicates with cache memory or a memory controller, and a system I/O bus is provided over which system bus devices such as the DMA controller, or the I/O devices, communicate with the system memory via the memory controller. The system I/O bus comprises a system bus and an I/O bus connected by a bus interface unit. The I/O devices communicate with one another over the I/O bus. The I/O devices are also typically required to communicate with system bus devices such as system memory. Such communications must travel over both the I/O bus and the system bus through the bus interface unit.

In some instances a device coupled to the I/O bus needs to either read from or write to an address location on another device which is also coupled to the I/O bus; and, in some instances a device coupled to the I/O bus needs to read from an address located in the system memory, which system memory is coupled to the local bus. In this type of system, the listing of the memory addresses is contained in the memory controller which is coupled to the system bus and a local bus CPU complex.

Thus, when a device coupled to the I/O bus needs to read from or write to a memory address, the signal would have to pass through the bus interface unit to the memory controller. Logic in the memory controller then determines whether the address is in system memory or in a device coupled to the I/O bus and then communicate this information to the device coupled to the I/O bus before it can start transferring information. However, this communication through the bus control unit requires that the control unit arbitrate for the system bus, then write the required address information to the memory controller. When the memory controller determines where the address is located, it must then have either delayed giving up of the system bus or if given up, must arbitrate to get the system bus back, and then write the address location back to the bus interface unit.

All of this arbitration and "handshaking" is time consuming and is inefficient, especially when the read or write involves a device coupled to the I/O bus address writing to or reading from an address in a device which is also coupled to the I/O bus. Indeed, in certain systems when a device coupled to the I/O bus needs to read or write to memory, an extra delay is programmed into the cycle to allow sufficient time to compare the address and write the locations to the required devices.

Accordingly, it is an object of this invention to provide an efficient determination of an address location which a device coupled to the I/O bus can write data to or read data from.

SUMMARY OF THE INVENTION

The present invention provides a bus interface unit coupling a system bus to an I/O bus that includes a function that performs a memory compare in the bus interface unit when a read or write request is made from a device coupled to the I/O bus. If the address is in a device coupled to the I/O bus then the requesting device coupled to the I/O bus reads or writes directly from or to the address on the I/O bus without the intervention of the bus interface unit. On the other hand, if the address is in the system memory, the bus control unit passes the data or request through to the system bus. Thus, there is no time wasted in going through the bus control device to the memory controller to perform the memory compare function and then return with the information to the requesting device coupled to the I/O bus, this function being performed entirely by the bus interface unit.

BRIEF DESCRIPTION OF THE DRAWINGS

FIG. 1 is a schematic block diagram of a computer system incorporating a bus interface unit constructed according to the principles of the present invention;

FIG. 2 is a schematic block diagram of the bus interface unit of the computer system of FIG. 1;

FIGS. 2A and 2B comprise FIG. 2 according to the principles of the present invention;

FIG. 4 is a schematic block diagram of the arbitration of the memory compare;

FIG. 5 is a schematic showing the address locations of memory as either system memory or memory on devices coupled to the I/O bus; and FIGS. 6 and 7 are logic diagrams of the operation of the memory compare function in the bus interface unit.

DETAILED DESCRIPTION OF THE PREFERRED EMBODIMENT

Figure 1A:
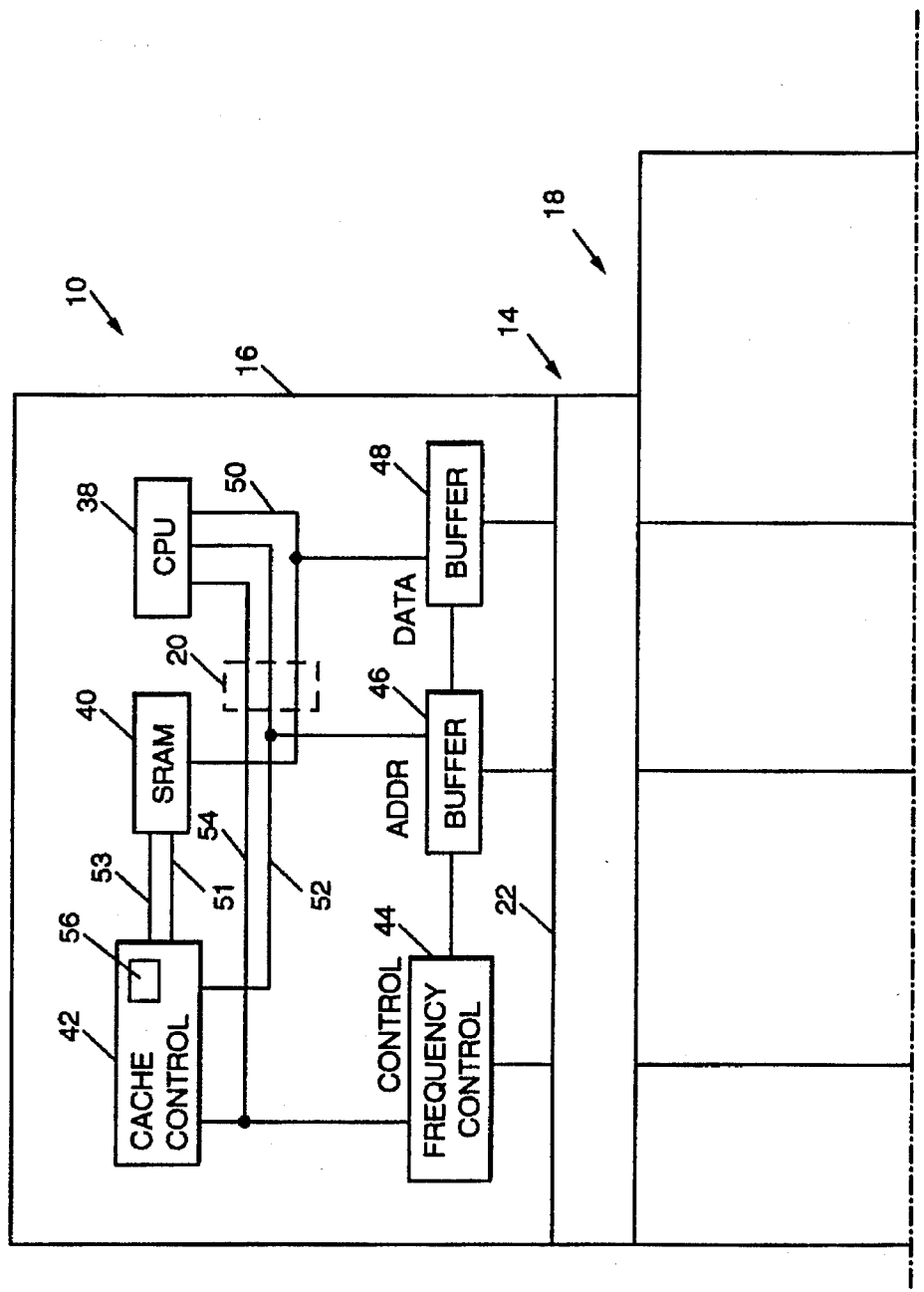
FIGS. 1A and 1B comprise FIG. 1 according to the principles of the present invention.
Figure 1B:
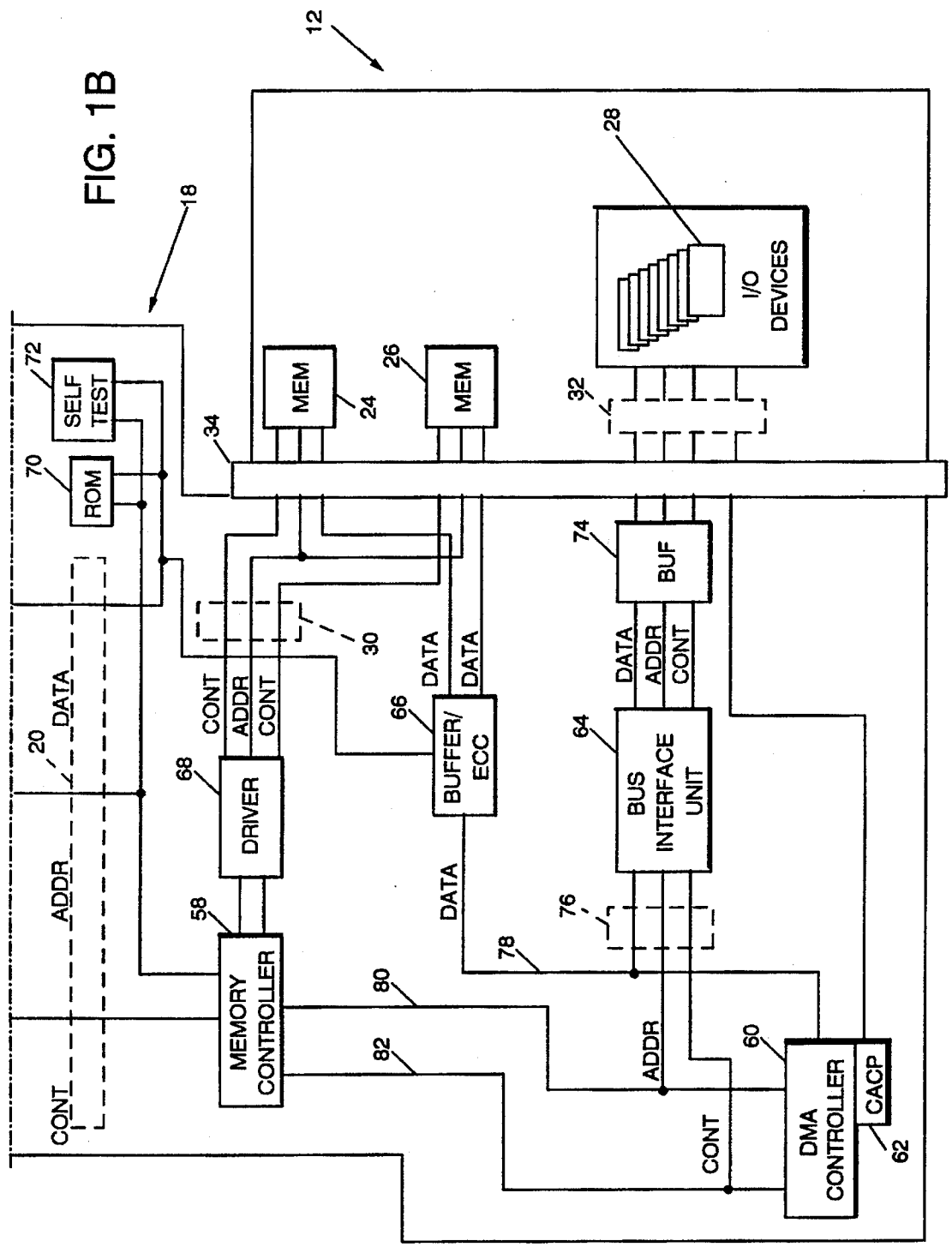

Referring first to FIG. 1, a computer system shown generally at 10 comprises system board 12 and processor complex 14. Processor complex includes processor portion 16 and base portion 18 connected at processor local bus 20 via local bus connector 22. Processor portion 16 operates at 50 MHz and base portion 18 operates at 40 MHz.

System board 12 includes interleaved system memories 24 and 26 and input/output (I/O) devices 28. Communications between memories 24 and 26 and processor complex 14 are handled by memory bus 30, and communications between I/O devices 28 and processor complex 14 are carried by I/O bus 32. Communications between I/O devices and memories 24 and 26 are handled by I/O bus 32, system bus 76 and memory bus 30. I/O bus 32 may conform to MICRO CHANNEL® computer architecture. Memory bus 30 and I/O bus 32 are connected to processor complex base portion 18 via processor complex connector 34. I/O devices such as memory expansion devices may be connected to the computer system 10 via I/O bus 32. System board 12 may also include conventional video circuitry, timing circuitry, keyboard control circuitry and interrupt circuitry (none of which are shown) which may be used by computer system 10 during normal operation.

Processor portion 16 of processor complex 14 includes central processing unit (CPU) 38 which, in the preferred embodiment, is a 32-bit microprocessor available from Intel, Inc. under the trade designation i486. Processor portion 16 also includes static random access memory (SRAM) 40, cache control module 42, frequency control module 44, address buffer 46 and data buffer 48. Local bus 20 comprises data information path 50, address information path 52 and control information path 54. Data information paths 50 are provided between CPU 38, SRAM 40 and data buffer 48. Address information paths 52 are provided between CPU 38, cache control module 42 and address buffer 46. Control information paths 54 are provided between CPU 38, cache control module 42 and frequency control module 44. Additionally, address and control information paths are provided between cache control module 42 and SRAM 40.

SRAM 40 provides a cache function by storing in short term memory information from either system memories 24 or 26 or from expansion memory which is located on an I/O device 28. Cache control module 42 incorporates random access memory (RAM) 56 which stores address locations of memories 24 and 26. CPU 38 may access information cached in SRAM 40 directly over the local bus 20. Frequency control module 44 synchronizes operation of the 50 Mhz processor portion 16 with the 40 MhZ base portion 18 and also controls the operation of buffers 46 and 48. Accordingly, frequency control module 44 determines the times at which information is captured by buffers 46 and 48 or the times at which information that is stored in these buffers is overwritten. Buffers 46 and 48 are configured to allow two writes from memories 24 and 26 to be stored simultaneously therein. Buffers 46 and 48 are bi-directional, i.e., they are capable of latching information which is provided by the CPU 38 and information which is provided to the CPU. Because buffers 46 and 48 are bi-directional, processor portion 16 of the processor complex 14 may be replaced or upgraded while maintaining a standard base portion 18.

Base portion 18 includes memory controller 58, direct memory access (DMA) controller 60, central arbitration control point (CACP) circuit 62, bus interface unit 64 and buffer/error correction code (ECC) circuit 66. Base portion 18 also includes driver circuit 68, read only memory (ROM) 70, self test circuit 72 and buffer 74. System bus 76 comprises a data information path 78, and address information path 80 and a control information path 82. The data information path connects buffer 74 with bus interface unit 64; bus interface unit 64 with DMA controller 60 and buffer/ECC circuit 66; and buffer/ECC circuit 66 with system memories 24 and 26. The address information path and the control information path each connect memory controller 58 with DMA controller 60 and bus interface unit 64; and bus interface unit 64 with buffer 74.

Memory controller 58 resides on both CPU local bus 20 and system bus 76, and provides the CPU 38, the DMA controller 60 or bus interface unit 64 (on behalf of an I/O device 28) with access to system memories 24 and 26 via memory bus 30. The memory controller 58 initiates system memory cycles to system memories 24 and 26 over the memory bus 30. During a system memory cycle, either the CPU 38, the DMA controller 60 or bus interface unit 64 (on behalf of an I/O device 28) has access to system memories 24 and 26 via memory controller 58. The CPU 38 communicates to system memory via local bus 20, memory controller 58 and memory bus 30, while the DMA controller 60 or bus interface unit 64 (on behalf of an I/O device 28) access system memory via system bus 76, memory controller 58 and memory bus 30.

For CPU 38 to I/O bus 32 read or write cycles, address information is checked against system memory address boundaries. If the address information corresponds to an I/O expansion memory address or I/O port address, then memory controller 58 initiates an I/O memory cycle or I/O port cycle with an I/O device 28 (via bus interface unit 64) over the I/O bus 32. During a CPU to I/O memory cycle or I/O port cycle, the address which is provided to memory controller 58 is transmitted from system bus 76 to I/O bus 32 via bus interface unit 64 which resides intermediate these two buses. The I/O device 28 which includes the expansion memory to which the address corresponds receives the memory address from I/O bus 32. DMA controller 60 and the bus interface unit 64 control the interchange of information between system memories 24 and 26 and expansion memory which is incorporated into an I/O device 28.

DMA controller 60 also provides three functions on behalf of processor complex 14. First, the DMA controller 60 utilizes a small computer subsystem control block (SCB) architecture to configure DMA channels, thus avoiding the necessity of using programmed I/O to configure the DMA channels. Second, DMA controller provides a buffering function to optimize transfers between slow memory expansion devices and the typically faster system memory. Third, DMA controller 60 provides an eight channel, 32-bit, direct system memory access function. When providing the direct system memory access function, DMA controller 60 may function in either of two modes. In a first mode, DMA controller 60 functions in a programmed I/O mode in which the DMA controller is functionally a slave to the CPU 38. In a second mode, DMA controller 60 itself functions as a system bus master, in which DMA controller 60 arbitrates for and controls I/O bus 32. During this second mode, DMA controller 60 uses a first in, first out (FIFO) register circuit.

CACP circuit 62 functions as the arbiter for the DMA controller, I/O device bus controllers and the CPU (if accessing I/O devices). CACP circuit 62 receives arbitration control signals from DMA controller 60, memory controller 58 as well as from I/O devices, and determines which devices may control the I/O bus 32 and the length of time during which the particular device will retain control of the I/O bus.

Driver circuit 68 provides control information and address information from memory controller 58 to system memories 24 and 26. Driver circuit 68 drives this information based upon the number of single in-line memory modules (SIMMs) which are used to construct system memories 24 and 26. Thus, driver circuit 68 varies the signal intensity of the control and address information which is provided to system memories 24 and 26 based upon the size of these memories.

Buffer circuit 74 provides amplification and isolation between processor complex base portion 18 and system board 12. Buffer circuit 74 utilizes buffers which permit the capture of boundary information between I/O bus 32 and bus interface unit 64 in real time. Accordingly, if computer system 10 experiences a failure condition, buffer circuit 74 may be accessed by a computer repair person to determine the information which was present at connector 34 upon failure of the system.

ROM 70 configures the system 10 upon power-up by initially placing in system memory data from expansion memory. Self test circuit 72, which is connected to a plurality of locations within base portion 18, provides a plurality of self test features. Self test circuit 72 accesses buffer circuit 74 to determine if failure conditions exist, and also tests the other major components of base portion 18 upon power-up of the system 10 to determine whether the system is ready for operation.

Figure 2B:
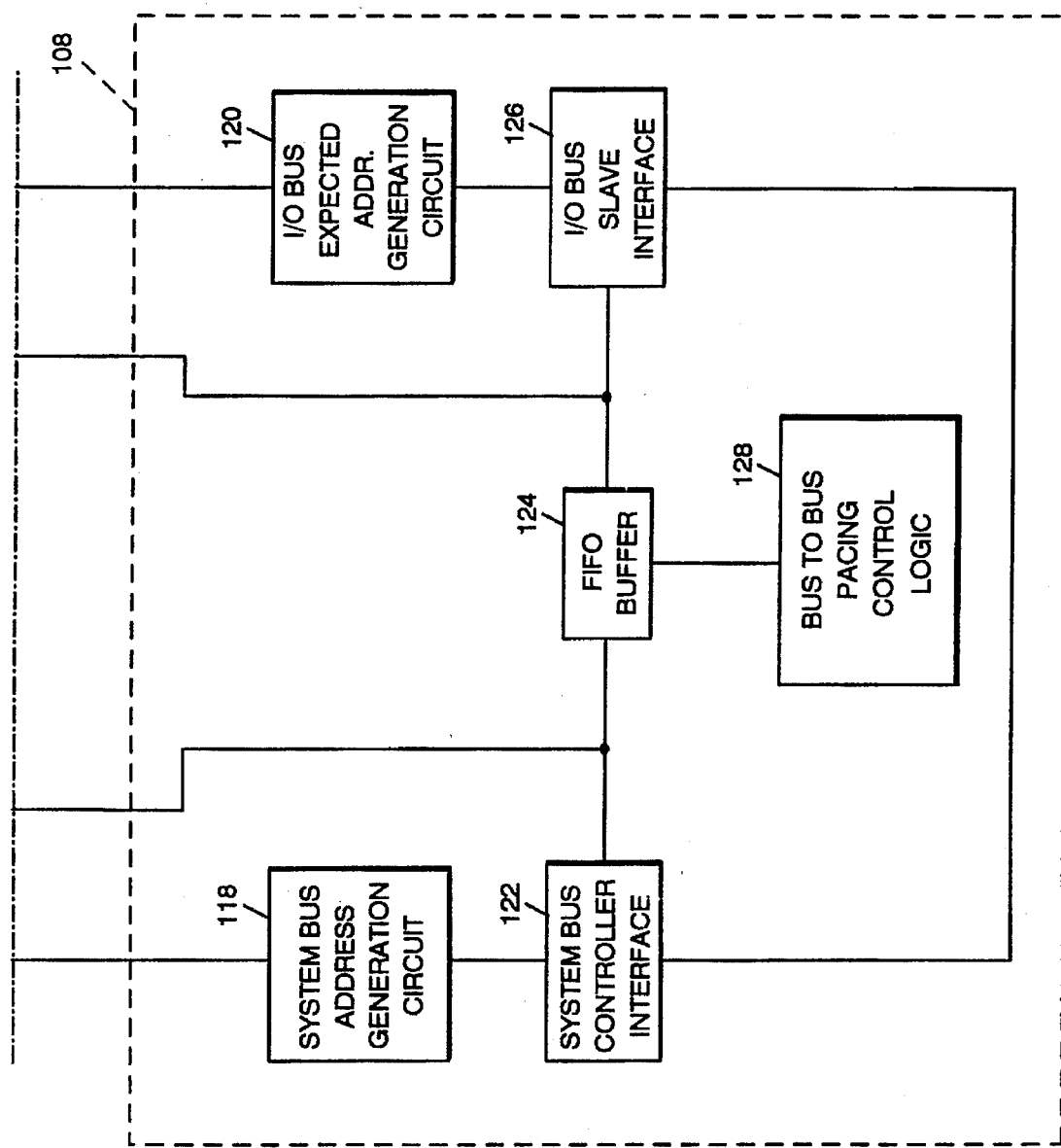

Referring to FIG. 2, a schematic block diagram of the bus interface unit 64 of the system of FIG. 1 is shown. Bus interface unit 64 provides the basis for implementation of the present invention by providing a bi-directional high speed interface between system bus 76 and I/O bus 32.

Bus interface unit 64 includes system bus driver/receiver circuit 102, I/O bus driver/receiver circuit 104 and control logic circuits electrically connected therebetween. Driver/receiver circuit 102 includes steering logic which directs signals received from the system bus 76 to the appropriate bus interface unit control logic circuit and receives signals from the bus interface unit control logic circuits and directs the signals to the system bus 76. I/O bus driver/receiver circuit 104 includes steering logic which directs signals received from the I/O bus 32 to the appropriate bus interface unit control logic circuit and receives signals from the bus interface unit control logic circuits and directs the signals to the I/O bus 32.

The bus interface unit control logic circuits include system bus to I/O bus translation logic 106, I/O bus to system bus translation logic 108, memory address compare logic 110, error recovery support logic 112, and cache snooping logic 114. Programmed I/O circuit 116 is also electrically coupled to system driver/receiver circuit 102.

The system bus to I/O bus translation logic 106 provides the means required for the DMA controller 60 or the memory controller 58 (on behalf of CPU 38) to act as a system bus controller to access the I/O bus 32 and thereby communicate with I/O devices 28 acting as slave devices on the I/O bus. Translation logic 106 translates the control, address and data lines of the system bus 76 into similar lines on the I/O bus 32. Most control signals and all address signals flow from the system bus 76 to the I/O bus 32 while data information flow is bi-directional. The logic which acts as system bus slave monitors the system bus 76 and detects cycles which are intended for the I/O bus 32. Upon detection of such a cycle, the system bus slave translates the timing of signals on the system bus to I/O bus timing, initiates the cycle on the I/O bus 32, waits for the cycle to be completed, and terminates the cycle on the system bus 76.

The I/O bus to system bus translation logic 108 comprises system bus address generation circuit 118, I/O bus expected address generation circuit 120, system bus controller interface 122, FIFO buffer 124, I/O bus slave interface 126 and bus to bus pacing control logic 128. System bus controller interface 122 supports a high performance 32 bit (4 byte) i486 burst protocol operating at 40 MHZ. Data transfers of four, eight and sixteen bytes in burst mode and one to four bytes in no-burst mode are provided. I/O bus slave interface 126 monitors the I/O bus 32 for operations destined for slave devices on the system bus 76 and ignores those operations destined for the I/O bus 32. All cycles picked up by the I/O bus slave interface 126 are passed on to the FIFO buffer 124 and the system bus controller interface 122.

The I/O bus to system bus translation logic 108 provides the means required for an I/O device 28 to act as an I/O bus controller to access system bus 76 and thereby read or write to system memories 24 and 26. In either of these operations, an I/O device controls the I/O bus. The asynchronous I/O bus interface 126, operating at the speed of the I/O device, permits the bus interface unit 64 to act as a slave to the I/O device controller on the I/O bus 32 to decode the memory address and determine that the read or write cycle is destined for system memories 24 or 26. Simultaneously, the system bus controller interface 122 permits the bus interface unit 64 to act as a controller on the system bus 74. The memory controller 58 (FIG. 2) acts as a slave to the bus interface unit 64, and either provides the interface 64 with data read from system memory or writes data to system memory. The reads and writes to system memory are accomplished through the FIFO buffer 124, a block diagram of which is illustrated in FIG. 3.

Figure 3:
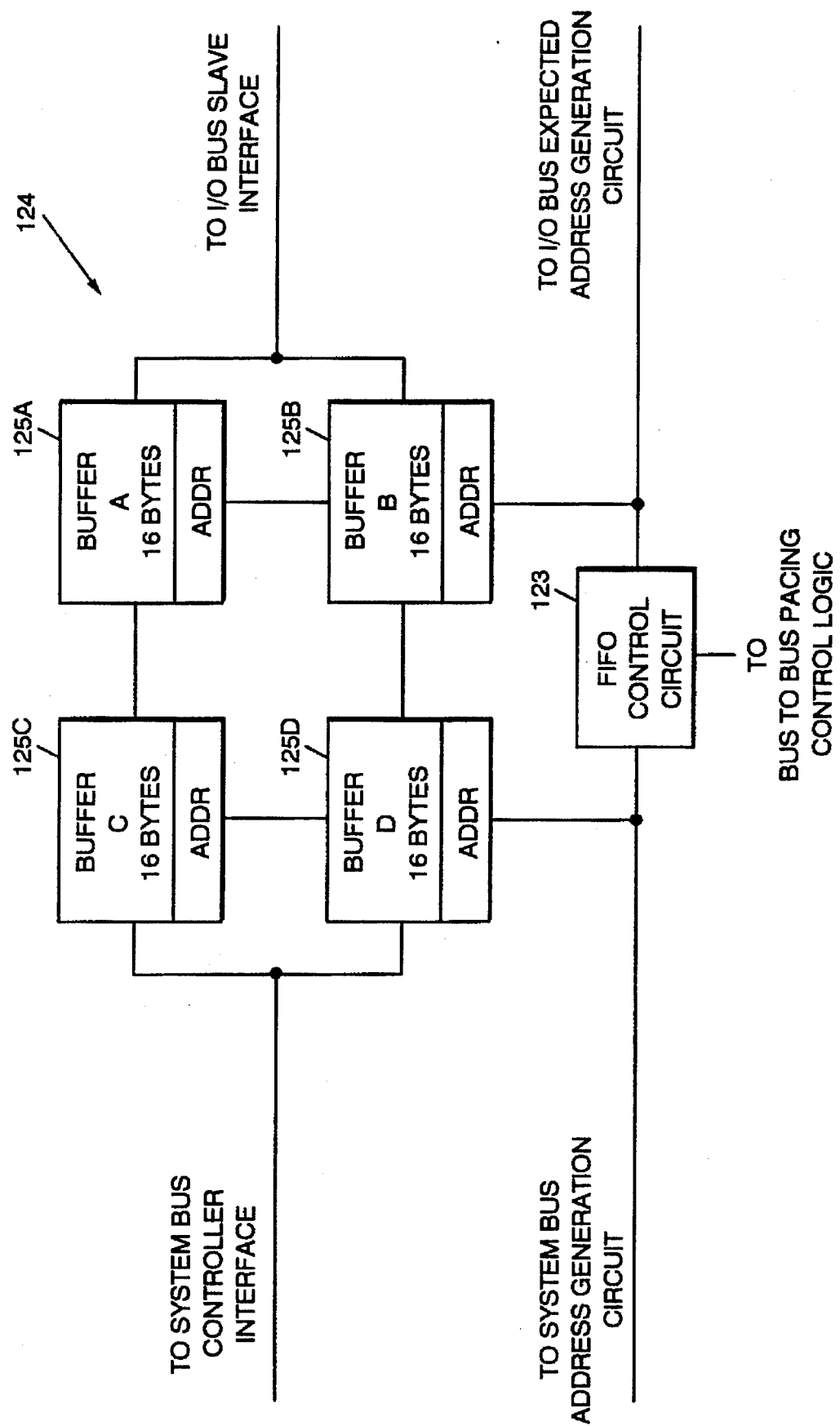
FIG. 3 is a schematic block diagram of the FIFO buffer of the bus interface unit of FIG. 2.

As shown in FIG. 3, FIFO buffer 124 is a dual ported, asynchronous, bi-directional storage unit which provides temporary storage of data information between the system and I/O buses 76, 32. FIFO buffer 124 comprises four sixteen-byte buffers 125A–125D and FIFO control circuit 123. The four buffers 125A–125D buffer data to and from I/O bus controllers and system bus slaves, thereby allowing simultaneous operation of the I/O bus 32 and the system bus 76. The FIFO buffer 124 is physically organized as two thirty-two byte buffers (125A/125B and 125C/125D). The system bus controller interface 122 and the I/O bus slave interface 126 each control one thirty-two byte buffer while the other thirty-two byte buffer operates transparent to them. Both of the thirty-two byte buffers are utilized for read and write operations.

Each FIFO 124A, 125B, 125C, 125D has an address register section either physically associated with the respective FIFO, or logically associated therewith. As data is transferred from the I/O bus 32 to FIFO 125A, the data will be accumulated until the 16 byte buffer is filled with 16 bytes of data, provided that the addresses are contiguous. If a non-contiguous address is detected by the address action, the FIFO 125A will transfer the stored data to FIFO 125C, and at the same time FIFO 125B will start to receive this data from the new non-contiguous address. FIFO 125B will continue just as FIFO 125A did until it is filled with 16 bytes of data, or another non-contiguous address is detected. FIFO 125B will then transfer the stored data to FIFO 125D, and FIFO 125A again starts to store data; thus, it is possible to store up to four 16 byte blocks of non-contiguous address data.

Further, by having two 32 byte buffers in parallel the reading and writing of data can be toggled between them thus giving an essentially continuous read or write function.

Moreover, by splitting the 32 byte buffers into two 16 bytes buffer sections which are coupled to other I/O bus 32 or system bus 26, the number of storage buffers can be increased with minimal impact on the performance of the FIFO as related to the capacitive loading on signals clocking data in or out of the storage registers. This is accomplished because for every two buffers added (in parallel) only half the capacitive loading is added to the loading of clock signals on each bus.

Additionally, by having two 16 byte buffers in series in each leg, once one of the 16 byte buffers is filled with data, such as in a read operation, the data can be transferred to the other 16 byte buffers in series therewith, while the other parallel leg is accumulating data. Hence, there is no time lost in either accumulating data, or transferring the data from one bus to the other.

The logic for controlling the operation of the FIFO 124 is supplied by FIFO Control Circuit 123.

A particular I/O device 28 may write to system memories 24 or 26 via I/O bus in bandwidths of either 1, 2 or 4 bytes (i.e., 8, 16 or 32 bits). During writes to system memory by an I/O device 28, the first transfer of write data is initially stored in the FIFO buffer 125A or 125B. The I/O bus expected address generation circuit 120 calculates the next expected, or contiguous, address. The next contiguous address is checked against the subsequent I/O address to verify if the subsequent transfers are contiguous or not. If contiguous, the second byte or bytes of write data is sent to the same FIFO buffer 125A or 125B. The FIFO receives data at asynchronous speeds of up to 40 megabytes per second from the I/O bus 32.

This process continues until either buffer 125A or 125B is full with a 16-byte packet of information or a non-contiguous address is detected. On the next clock cycle, assuming that buffer 125A is full, the data in buffer 125A is transferred to buffer 125C. Similarly, when buffer 125B is full, all of its contents are transferred to buffer 125D in a single clock cycle. The data stored in the buffers 125C and 125D is then written to system memory via an i486 burst transfer at the system bus operational speed. The operation of FIFO buffer 124 during a write to system memory by an I/O device is thus continuous, alternating between buffers 125A and 125B, with each emptying into adjacent buffer 125C or 125D, respectively, while the other is receiving data to be written to system memory. The FIFO buffer 124, then, optimizes the speed of data writes to system memory by (i) anticipating the address of the next likely byte of data to be written into memory and (ii) accommodating the maximum speed of write data from the FIFO buffer to system memory via the system bus 76.

During reads of data from system memory to an I/O device 28, FIFO buffer 124 operates differently. The system bus address generation circuit 118 uses the initial read address to generate subsequent read addresses of read data and accumulate data in buffer 125C or 125D. Because the system bus supports transfers in bandwidths of 16 bytes wide, the system bus controller interface 122 may prefetch 16-byte packets of contiguous data and store it in buffers 125C or 125D without the I/O bus 32 actually providing subsequent addresses, thus reducing latency between transfers. When buffer 125C is full of prefetched data, it transfers its contents to buffer 125A in one clock cycle. Buffer 125D similarly empties into buffer 125B when full. The data in buffers 125A and 125B may then be read by a particular I/O device controller in bandwidths of 1, 2 or 4 bytes. In this way, system bus address generation circuit 118 functions as an increment counter until instructed to by the I/O controller device to stop prefetching data.

Bus to bus pacing control logic 128 creates a faster access to system memory for high speed I/O devices. The bus to bus pacing control logic 128 overrides the normal memory controller arbitration scheme of system 10 by allowing an I/O device in control of the I/O bus 32 uninterrupted access to system memory during transfers of data by faster devices which require multiple cycles, rather than alternating access to the memory controller 58 between the I/O device and the CPU. Thus, even if a local device such as the CPU has a pending request for control of the memory bus during a multiple cycle transmission by an I/O device, the bus to bus pacing control logic 128 will grant the I/O device continued control of the memory bus.

The programmed I/O circuit 116 is the portion of the bus interface unit 64 which contains all of the registers which are programmable within the bus interface unit 64. The registers have bits associated therewith to determine whether a particular register is active or inactive. These registers define, inter alia, the system memory and expansion memory address ranges to which the bus interface unit 64 will respond, the expansion memory addresses which are either cacheable or noncacheable, the system memory or cache address ranges, and whether or not parity or error checking is supported by the bus interface unit. Accordingly, programmed I/O circuit 116 identifies for the bus interface unit 64 the environment in which it resides, and the options to which it is configured. The registers in programmed I/O circuit 116 cannot be programmed directly over the I/O bus 32. Hence, in order to program the system 10, the user must have access to an I/O device which may communicate over the system bus to the programmed I/O circuit 116 at the CPU level.

Memory address compare logic 110 determines if a memory address corresponds to system memory or corresponds to expansion memory which is located on I/O device 28 coupled to the I/O bus 32. Because the system memory as well as the expansion memory may be in non-contiguous blocks of addresses, memory address compare logic 110 includes a plurality of comparators which are loaded with boundary information from registers in the programmed I/O circuit 116 to indicate which boundaries correspond to which memory. After a particular memory address is compared with the boundary information by the memory address compare logic, the bus interface unit is prepared to react accordingly. For example, if an I/O device controlling the I/O bus 32 is reading or writing to expansion memory, the bus interface circuit need not pass that address to the memory controller 58, thereby saving time and memory bandwidth.

Error recovery support logic 112 permits the system 10 to continue operations even if a data parity error is detected. On any read or write access by an I/O device 28 to system memories 24 or 26, parity of the data is checked. Support logic 112 interacts with a register in the programmed I/O circuit 116 for capturing the address and the time of the detected parity error. The contents of this register may then be acted upon by appropriate system software. For example, the CPU 38 may be programmed for a high level interrupt to pull the address out of the register at any time a parity error is detected. The CPU may then decide, based on the system software instructions, whether to continue system operations or merely terminate operation of the identified source of the parity error.

Cache snooping logic 114 permits the bus interface unit 64 to monitor the I/O bus 32 for any writes to expansion memory by an I/O device taking place over the I/O bus 32. The snooping logic first determines if the write to expansion memory occurred in expansion memory which is cacheable in SRAM 40. If it is not cacheable expansion memory, there is no danger of corrupt data being cached. If, however, a positive compare indicates that the write occurred in cacheable expansion memory, a cache invalidation cycle is initiated over the system bus 76. The CPU is thus instructed to invalidate the corresponding address in SRAM 40. Cache snooping logic 114 provides means to store the address of a positive compare so that snooping of the I/O bus may continue immediately after detection of the first positive compare, thereby permitting continuous monitoring of the I/O bus 32.

In some instances, a device coupled to the I/O bus 32 needs to either read data from or write data to an address location on another device coupled to the I/O bus 32, and in some instances a device coupled to the I/O bus 32 needs to either read data from or write data to an address on system memory 24, 26, which is coupled to the local bus 20 and to system bus 76.

In the present system, the location of all of the addresses are contained in the memory controller 58. Thus, when the CPU 38 or other device coupled to the local bus 20 needs to write to or read from a given address, the memory controller 58 can read the address of the data to be read or written from the local bus 20. The logic in the memory controller then determines whether the address is in system memory 24, 26 or in memory on a device 28 coupled to the I/O bus 32, and then provides access to the appropriate bus. However, if a device coupled to the I/O bus 32 has to perform a read or write function from or to a particular address, it would be inefficient to require such a device coupled to the I/O bus 32 to interrogate the memory controller 58 since the address location inquiry would have to be passed from the I/O bus 32 through the bus interface unit 64 to the memory controller 58. The memory controller would have to determine the address location and pass the address location back the same way to the requesting unit. This passing through the bus control unit takes time and is inefficient, especially when the read or write involves an I/O bus address and indeed would require an extra hold time to be programmed into the access time at the bus interface unit 64 or require a separate hand shaking operation.

Accordingly, a logic function 140 (FIG. 4) is provided in the bus interface unit 64 which allows a memory address compare function to take place at the bus interface unit 64 when a write to or read from request is made by a device coupled to the I/O bus 32. If the address is in a device 28 coupled to the I/O bus 32 then the requesting device coupled to the I/O bus 32 reads or writes directly from or to the address on the I/O bus 32 without the intervention of the bus interface unit 64. If the memory location is an address in the system memory 24, 26, then the data is passed through the bus interface unit 64 to the system bus 76. Thus, there is no time wasted in going through the bus interface unit 64 to the system bus 76 and then to the memory controller 58 to perform the address compare function and then return the information to the requesting device on the I/O bus 32.

FIG. 4 depicts this address compare function 140 as it is contained within the bus interface unit 64. The bus interface unit 64 includes a register of address spaces 142 and defines those address spaces which are in system memory 24, 26 and those which are in devices 28 coupled to the I/O bus 32. An illustrative example of possible ranges of addresses available in a system are shown diagrammatically in FIG. 5, as number addresses from 0 to 16 megabytes. Certain of these ranges, e.g. range 144 which represents 0 to 1 megabyte, range 146 which represents 4 to 6 megabytes, and range 148 which represents 8 to 10 megabytes are designated as system memory ranges. The programmed I/O circuit 116 configures these ranges in the system. These ranges are merely illustrative and other ranges can be chosen.

The logic to perform the compare functions is incorporated in the bus interface unit 64. When I/O device 28 gains control of the I/O bus 32 and the system bus 76, an input from a requesting device coupled to the I/O bus 32 for a read or write operation from or to memory is supplied to the address compare function 140 of the bus interface unit 64. The compare function 140 of the bus interface unit 64 compares the address of the data to be read or written to the location of addresses stored. If the requested address is on the system bus, a signal is outputted to the system bus indicating that the bus interface unit 64 will write data on or read data from the system bus. However, if the address is in memory on the I/O bus 32, the requesting device on the I/O bus connects directly on the I/O bus with the I/O memory location. In this instance, the bus interface unit 64 performs no function after identifying the location of the address as being on the I/O bus.

FIG. 6 shows a high level logic diagram of the memory address compare function 140. Each of the range comparisons 144, 146, and 148 inputs a signal to each of memory address compare functions 150, 152 and 154. Each compare function 150, 152, 154 determines if the inputted address is within any of the address ranges of the system memory ranges 144, 146 or 148. If the address is within any one of the system bus ranges, then a HIGH signal is generated to indicate the address is in system memory, accessible through the system bus. If the address is not in any ranges on the system bus, a LOW signal is generated indicating the address is not on the system bus 76 and hence, on the I/O bus 32.

Memory compare function 152 acts similarly to compare function 150 except that either the current address 158 or the next contiguous address 160 on the I/O bus are supplied through multiplexer 162 to memory address compare function 152. If either the current address 158 or the next contiguous address 160 is in system memory, depending upon which input the multiplexer 162 is active, then a HIGH signal is generated as an output from a memory address compare function 152. This allows operation in a data streaming manner; i.e. data from a contiguous series of memory locations can be written or read without a compare function being performed for each address before it is accessed. To assure that this next address has not crossed the boundary between system memory and I/O memory, the compare function 152 compares this next address.

The input memory address compare function 154 on the other hand is inputted from the system bus 76. This input is used when data is being prefetched by the DMA in packets from a system memory location 24, 26. System bus addresses 164 supplied from the DMA controller 60 to a multiplexer 168 indicating if the requested location is in system memory. Signal 166 is from the bus interface unit 64 to the multiplexer 168 indicating if the next continuous packet address is in system memory ranges. If it is, it is prefetched and data streaming or contiguous burst reads continues. This streaming mode of data reading is a mode wherein data is read from the system memory in data packets of 16 bytes into the bus interface unit from each contiguous address location until the grant time has ceased or until a boundary between system memory and I/O memory has been crossed, or streaming mode is terminated by I/O device 28.

Thus, the compare functions 150 and 152 are responsive to address being generated on the I/O bus 32, and the memory address compare function 154 is responsive for addresses being generated on the system bus 76. And indeed, the logic 142 can operate from both the I/O bus 32 and system bus 76 at the same time.

Figure 7:
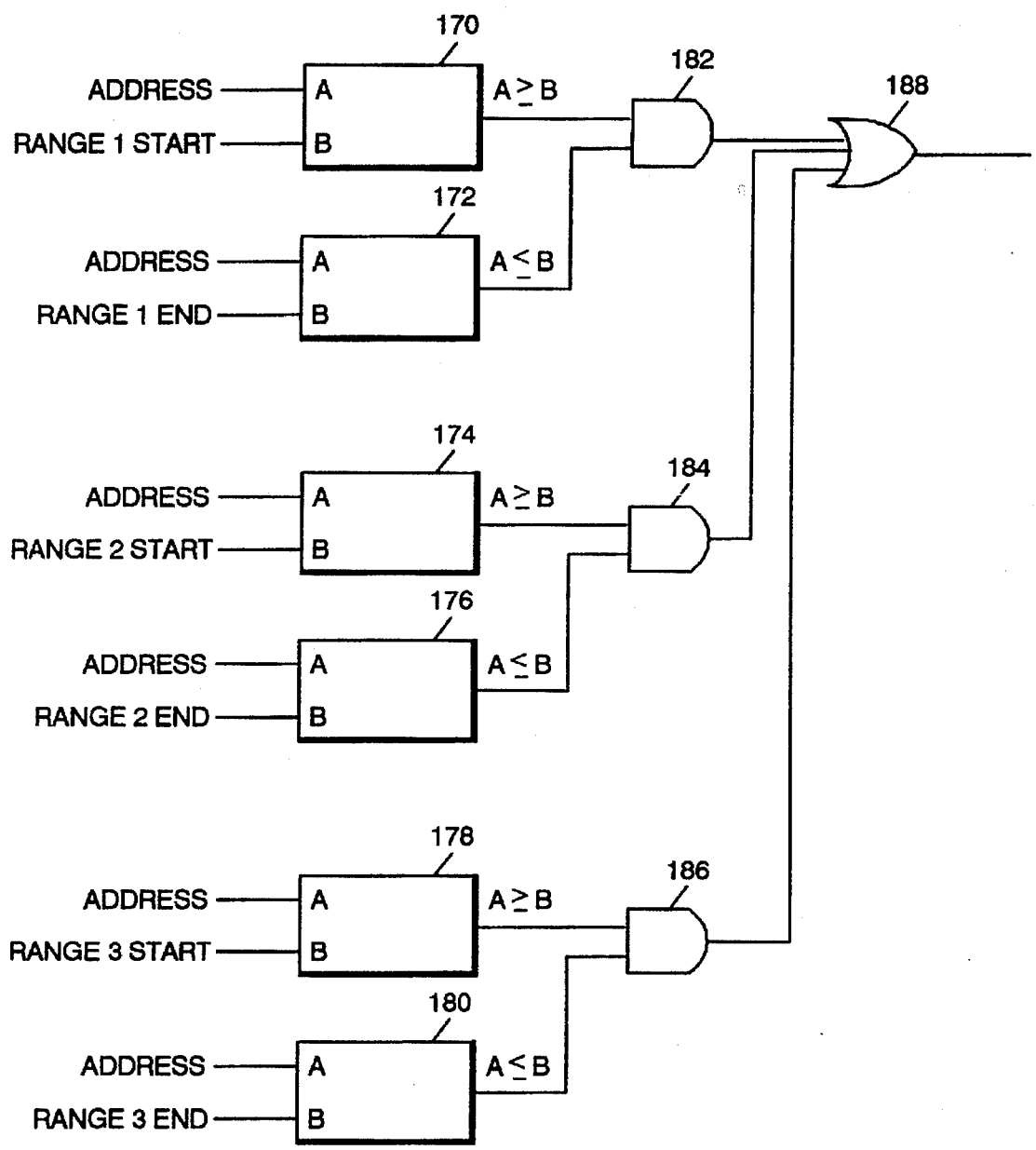

The logic of each of the compare function 150, 152, and 154 is depicted in FIG. 7. As shown therein, an address is supplied to each of six comparators 170, 172, 174, 176, 178, 180. This address is the address 156 supplied to compare function 150 or the address from multiplexer 162 supplied to compare function 152, or the address from multiplexer 168 supplied to compare function 154. Comparator 170 compares the inputted address with the start of range 144, and comparator 172 compares the inputted address to the end of range 144; comparator 174 compares the inputted address with the start of range 146 and comparator 176 compares the inputted address with the end of range 146; comparator 178 compares the inputted address with the start of range 148 and comparator 180 compares the inputted address with the end of range 148. The address comparisons are outputted from comparators 170, and 172 to AND gate 182; the output of comparators 174 and 176 are outputted to AND gate 184, and the outputs of comparators 178 and 180 are output to AND gate 186. The AND gates 182, 184 and 186 are all outputted to "OR" gate 188 to give a HIGH if the compared address is in any of the ranges 144, 146, or 148. This HIGH signal will indicate the memory location is on the system bus.

Although several embodiments of this invention have been shown and described, various adaptations and modifications can be made without departing from the scope of the invention as defined in the appended claims.

Having thus described the preferred embodiment, the invention is now claimed to be:

1. A computer system comprising:
   processor and cache memory subsystems;
   multiple buses, including an input/output (IO) bus, a system bus, and a local bus;
   said IO bus connected directly to input/output (IO) devices, including IO memory devices; each said bus carrying signals representing address data and control information; said IO bus allowing an individual said IO device to control said IO bus as a bus master for transferring data directly between the respective individual IO device and another IO device via only said IO bus;
   said processor and cache memory subsystems connected directly to said local bus;
   at least one system memory device connected to said local and system buses;
   a memory controller controlling data transfers between said at least one system memory device and said processor and cache subsystems via said local bus; and
   a bus interface unit connected between said IO devices and said system bus;
   said bus interface unit and memory controller cooperatively controlling transfers of data, between said IO devices and said at least one system memory device via said IO and system buses;
   said bus interface unit including
      means for determining if an address presented on said IO bus, by a said individual IO device controlling said IO bus as a bus master, requires a system read/write data transfer to be conducted between said individual device and a storage location in said at least one system memory device or if said address presented on said IO bus requires a peer IO read/write data transfer directly between the respective individual IO device and another one of said at least one IO devices via only said IO bus; and
      means responsive to said determinations by said determining means for taking a predetermined first action if a determination is made that a said presented address requires a said system read/write data transfer, and for causing a predetermined second action different from said first action when a determination is made that a said presented address requires a peer read/write data transfer wherein said first action requires said bus interface unit to cooperate with said memory controller to set up a said system read/write data transfer via said IO and system buses relative to said at least one system memory device and said second action requires said bus interface unit to allow said respective IO device acting as a said bus master to carry out a said peer read/write data transfer relative to said another IO device without intervention from said bus interface unit.

2. The computer system in accordance with claim 1, wherein said cache subsystem supports cache storage of data originating in both said at least one memory device and in selected cacheable locations in said IO memory devices, and wherein said determining means of said bus interface unit includes means for performing a cache snooping function to determine if a said address presented on said IO bus, and requiring a peer read/write data transfer relative to another said IO device involves a peer write data transfer to write data into a said cacheable location in a said IO memory device that requires a transfer between said respective IO device acting as master of said IO bus and a memory location in another said IO device.

3. The computer system in accordance with claim 1 wherein said determining means of said bus interface unit includes:
   a global address map of all addresses accessible to said IO devices which can act as bus masters on said IO bus; and
   means for comparing each address presented on said IO bus, by a said IO device acting as a said bus master of said IO bus, with addresses in said global address map.

4. The computer system in accordance with claim 1 wherein read/write data transfers conducted by said bus interface unit and said IO device masters on said IO bus are conducted in streaming and single-transfer modes, said single-transfer mode involving single transactions in which only a single address is presented by a device controlling said IO bus and data is transferred only relative to the respective single address in a single cycle of operation of said IO bus; said streaming mode involving plural transactions in which a series of addresses are presented sequentially on said IO bus and a series of read/write data transfers are conducted relative to memory locations represented by said series of addresses, each transaction of said series requiring a discrete cycle of read/write data transfer on said IO bus; and said address determining means of said bus interface unit includes:

means effective during transfers in said streaming mode for determining if a next address in a respective said series of addresses has crossed a boundary between system memory locations contained in said at least one system memory device and IO memory locations contained in a said IO memory device; and means responsive to a said determination that said next address has crossed a said boundary to effectively switch said action causing means of said bus interface unit to reverse the action caused by said action causing means from said first action to said second action, if a boundary has been crossed from a system memory location to an IO memory location, and from said second action to said first action if a boundary has been crossed from a said IO memory location to a said system memory location.

5. The computer system in accordance with claim 4 wherein said at least one system memory device contains system memory locations mapped into at least two non-contiguous address ranges, and said means for determining crossing of a said boundary in said streaming mode includes:

means for determining when a said next address crosses a boundary between two non-contiguous address ranges in said system memory and when a said next address crosses a boundary between memory locations in said system memory device and memory locations in said IO memory devices; and said means to effectively switch between said first and second actions is activated only upon a determination that a said next address has crossed a boundary between system and IO memory locations and not upon a determination that a said next address has crossed a boundary between non-contiguous locations contained only in said system memory.

6. A method of operating a computer system containing: processor and cache memory subsystems; system memory devices; IO devices including IO memory devices; a memory controller controlling access to said system memory devices; and multiple buses, including an input/output (IO) bus connected to said IO devices, a system bus connected to said memory controller and said system memory devices, and a local bus connected to said system memory devices, said memory controller and said processor in cache subsystems;

each said bus carrying address, data and control signals; said IO bus supporting peer communication directly between said IO devices, allowing an individual said IO device to control said IO bus as a bus master for transferring data directly between the respective individual IO device and another IO device via said IO bus and not said system or local buses; said method comprising conducting operations between said IO bus and system bus for:

determining if an address presented on said IO bus, by a said IO device controlling said IO bus as a bus master, requires a system read/write data transfer to be conducted between said individual device and a storage location in said at least one system memory device or if said address presented on said IO bus requires a peer IO read/write data transfer directly between the respective individual IO device and another one of said at least one IO devices via only said IO bus;

in response to said address determination, affecting one of first and second predetermined and different actions; said first action being effected upon determination that a said presented address requires a said system read/write data transfer between a said IO device acting as an IO bus master and a said system memory device, and said second action being effected upon determination that a said presented address requires a peer read/write data transfer between a said device acting as IO bus master and another IO device connected to said IO bus wherein said first action consists of setting up and sustaining a read/write data transfer between said IO and system bus, and said second action consists of a null action relative to said IO bus which allows said respective IO device acting as a said IO bus master to carry out a said peer read/write data transfer relative to said another IO device without apparent assistance or intervention from any element of said computer system otherwise connected to the IO bus.

7. The method of operating a computer system in accordance with claim 6 wherein said cache subsystem supports cache storage of data originating in said system memory devices and in selected cacheable locations in said IO memory devices, and wherein said determining step and second action affecting steps include:

performing a cache snooping function relative to each said address presented on said IO bus for determining if a write data transfer associated with that address requires data to be written to a memory location, and if data is to be so written, for determining further if the location to receive the data is in a said system memory device or corresponds to a said cacheable memory location in a said another IO device; and upon determining in said cache snooping step that data is to be written to a said cacheable location in a said another IO device, including notifying said cache subsystem via said system bus and said memory controller that a cache location is currently addressed; and upon determining in said determining and cache snooping steps that a peer read/write data transfer is required between devices on said IO bus, which transfer does not require data to be written to a said cacheable location in a said IO memory device, effecting as said second action only a null action which does not involve signal communication by said computer system on any of said buses.

8. The method of operating a computer system in accordance with claim 6 wherein said determining step includes:

maintaining in said computer system, at an interface between said IO bus and said system bus, a global address map of all addresses accessible to said IO devices which can act as bus masters on said IO bus; and comparing each said address presented on said IO bus, by a said IO device acting as a said bus master of said IO bus, with addresses in said global address map for determining if each said address designates a memory location, and upon each determination that an address represents a said memory location, for distinguishing if the respective location is contained in a said system memory device or in a said IO memory device.

9. The method of operating a computer system in accordance with claim 8, wherein read/write data transfers conducted relative to said IO devices acting as said IO bus masters are conducted in data transfers conducted by said bus interface unit and said IO device masters on said IO bus are conducted in streaming and single-transfer modes; said single-transfer mode involving single transactions in which only a single address is presented by an IO device controlling said IO bus as a bus master, and data is transferred only relative to the respective single address in a single cycle of operation of said IO bus; said streaming mode involving a series of plural transactions in which a series of addresses are presented sequentially on said IO bus and a series of read/write data transfers are conducted relative to memory locations represented by said series of addresses, each transaction of said series requiring a discrete cycle of read/write data transfer on said IO bus; and said determining and action effecting steps including:

upon determining that a read/write data transfer is being conducted in streaming mode, determining for each successive address in the respective said series of addresses if the respective successive address transcends a boundary between system memory locations, contained in said memory devices, and IO memory locations contained in said IO memory devices; and upon determination that a said boundary has been transcended, effectively switching between effecting said first and second actions, so that if the last completed data transfer has been effected by means of a said first or second action, the next data transfer associated with said successive address will be effected respectively by means of a said second or first action.

10. A computer system comprising:

processor and cache memory subsystems;

multiple buses, including an input/output (IO) bus, a system bus, and a local bus; said IO bus connected directly to input/output (IO) devices, including IO memory devices; each said bus carrying signals representing address, data and control information; said IO bus allowing an individual IO device to control said IO bus as a bus master for transferring data directly between the respective individual IO device and another IO device via only said IO bus;

said processor and cache memory subsystems connected directly to said local bus and being physically isolated from said system and IO buses;

at least one system memory device connected to said local and system buses;

a memory controller controlling data transfers between said at least one system memory device and said processor and cache subsystems via said local bus; and a bus interface unit connected between said IO devices and said system bus;

said bus interface unit and memory controller cooperatively controlling transfers of data, between said IO devices and said at least one system memory device via said IO and system buses said bus interface unit including:

means for determining if an address presented on said IO bus, by a said individual IO device controlling said IO bus as a bus master, requires a system data transfer to be conducted between said individual device and a storage location in said at least one system memory device or if said address presented on said IO bus requires a peer IO data transfer directly between the respective individual IO device and another one of said at least one IO devices via only said IO bus;

means responsive to said determinations by said determining means for taking a predetermined first action if a determination is made that a said presented address requires a said system data transfer and for causing a predetermined second action if a determination is made that a said presented address requires a peer data transfer, where in said first action requires said bus interface unit cooperates with said memory controller to set up a said system data transfer via said IO and system buses relative to said at least one system memory device; and in said second action said bus interface unit to allow said respective IO device acting as a said bus master to carry out a said peer data transfer relative to said another IO device without any apparent assistance or intervention from said bus interface unit; and wherein:

said cache subsystem supports cache storage of data originating in both said at least one memory device and in selected cacheable locations in said IO memory devices, and wherein:

said determining means of said bus interface unit includes means for performing a cache snooping function to determine if a said address presented on said IO bus, and requiring a peer data transfer relative to another said IO device involves a peer data transfer to write data into a said cacheable location in a said IO memory device that requires a transfer between said respective IO device acting as master of said IO bus and a memory location in another said IO device; and wherein:

if said snooping function determines that data is being written into a said cacheable location in a said IO memory device a cache invalidation action transpires including a communication from the bus interface unit to said memory controller via said system bus requiring the memory controller to relay a communication to said memory controller to effect invalidation of a cache location in the cache subsystem corresponding to said cacheable location in said IO memory device.

11. A method of operating a computer system containing: processor and cache memory subsystems; system memory devices; IO devices including IO memory devices; a memory controller controlling access to said system memory devices; and multiple buses, including an input/output (10) bus connected to said IO devices, a system bus connected to said memory controller and said system memory devices, and a local bus connected to said system memory devices, said memory controller and said processor and cache subsystems; each said bus carrying address, data and control signals; said IO bus supporting peer communication directly between said IO devices, allowing an individual said IO device to control said IO bus as a bus master for transferring data directly between the respective individual IO device and another IO device via only said IO bus; said method comprising conducting operations between said IO bus and system bus for:

determining if an address presented on said IO bus, by a said IO device controlling said IO bus as a bus master, requires a system data transfer to be conducted between said individual device and a storage location in said at least one system memory device or if said address presented on said IO bus requires a peer IO data transfer directly between the respective individual IO device and another one of said at least one IO devices;

effecting, in response to said address determination, one of first and second predetermined actions; said first action being effected upon determination that a said presented address requires a said system data transfer between a said IO device acting as an IO bus master and a said system memory device and consists of setting up and sustaining a data transfer between said IO and system buses; and said second action being effected upon determination that a said presented address requires a peer data transfer between a said device acting as IO bus master and another IO device connected to said IO bus and consists of a null action relative to said IO bus providing no apparent assistance or interference from said computer system for said respective IO device acting as a said IO bus master to carry out a said peer data transfer relative to said another IO device and wherein said cache subsystem supports cache storage of data originating in said system memory devices and in selected cacheable locations in said IO memory devices, and wherein said determining step and second action effecting steps include:

performing a cache snooping function relative to each said address presented on said IO bus for determining if a data transfer associated with that address requires data to be written to a memory location, and if data is to be so written, for determining further if the location to receive the data is in a said system memory device or corresponds to a said cacheable memory location in a said another IO device; and upon determining in said cache snooping step that data is to be written to a said cacheable location in a said another IO device, including, as part of said effected second action, notifying said cache subsystem via said system bus and said memory controller that a cache location is currently addressed; and upon determining in said determining and cache snooping steps that a peer data transfer is required between devices on said IO bus, which transfer does not require data to be written to a said cacheable location in a said IO memory device, effecting as second action only a null action which does not involve signal communication by said computer system on any of said buses.

12. The computer system in accordance with claim 2, wherein when said cache snooping function determines that data is being written into a said cacheable location in a said IO memory device, a cache invalidation action including a communication from the bus interface unit to said memory controller via said system bus requires the memory controller to relay a communication to said memory controller to effect invalidation of a cache location in the cache subsystem corresponding to said cacheable location in said IO memory device; and said second action occurs when said snooping function determines that a said peer write data transfer does not involve writing data to a said cacheable location in a said IO memory device is a null action in which said bus interface unit does not interact with either said system bus or said local bus.

* * * * *